United States Patent
Yoshida et al.

(10) Patent No.: US 7,538,926 B2
(45) Date of Patent: May 26, 2009

(54) OPTICAL SCANNING DEVICE AND IMAGE FORMING APPARATUS USING THE SAME

(75) Inventors: Hiroki Yoshida, Utsunomiya (JP); Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 11/845,731

(22) Filed: Aug. 27, 2007

(65) Prior Publication Data
US 2008/0291517 A1 Nov. 27, 2008

(30) Foreign Application Priority Data
Aug. 28, 2006 (JP) .............................. 2006-230659
Aug. 20, 2007 (JP) .............................. 2007-213825

(51) Int. Cl.
*G02B 26/08* (2006.01)

(52) U.S. Cl. ..................................... 359/215

(58) Field of Classification Search .......... 359/212–215
See application file for complete search history.

(56) References Cited

U.S. PATENT DOCUMENTS

| 4,612,555 A | 9/1986 | Hongou et al. ............... 346/160 |
| 5,206,755 A | 4/1993 | Yamakawa ................... 359/218 |
| 7,436,564 B2 * | 10/2008 | Gomi et al. ............... 359/213.1 |
| 2003/0151826 A1 | 8/2003 | Shibayama et al. ......... 359/642 |
| 2007/0041070 A1 | 2/2007 | Ishibe et al. ................ 359/216 |

FOREIGN PATENT DOCUMENTS

| EP | 1757973 | 2/2007 |
| GB | 2300727 | 11/1995 |
| JP | 2004-191416 | 7/2004 |

OTHER PUBLICATIONS

European Search Report dated Dec. 27, 2007 from corresponding European Application No. 07016760.6.

* cited by examiner

*Primary Examiner*—Euncha P Cherry
(74) *Attorney, Agent, or Firm*—Fitzpatrick, Cella, Harper & Scinto

(57) ABSTRACT

An optical scanning device having a deflector with an oscillating element wherein a relation $0.85<(dY/d\theta)/(dY_0/d\theta_0)<1.15$ is satisfied throughout an effective scan region, where $\theta_0$ is a deflection angle of the oscillating element as a light beam scans the center position $Y_0$ of an effective scan region on a scan surface with respect to a main-scan direction, $\theta$ is the deflection angle of the oscillating element as the light beam scans a scan position Y in the effective scan region with respect to the main-scan direction, $dY_0$ is an amount of change at the center position $Y_0$ on the scan surface with reference to an amount of change $d\theta_0$ of the oscillating element at the deflection angle $\theta_0$, and dY is an amount of change at the scan position Y on the scan surface with reference to an amount of change $d\theta$ of the oscillating element at the deflection angle $\theta$.

10 Claims, 7 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is suitably usable for an image forming apparatus such as laser beam printer, digital copying machine or multifunction printer, for example, having an electrophotographic process.

Conventionally, various proposals have been made for optical scanning devices using a reciprocal-motion oscillating element (optical deflector) as deflection means for deflectively scanning a light beam (see patent document No. 1).

Particularly, oscillating elements as the deflecting means which oscillate based on the resonance phenomenon have advantageous features that, as compared with oscillating elements without resonance phenomenon, high-frequency oscillation is easy to accomplish and the time required for a single scan can be shortened.

FIG. 9 is a schematic diagram of a main portion of a known type oscillating element based on the resonance phenomenon.

In FIG. 9, denoted at 90 is an oscillating element performing reciprocal motion, and denoted at 91 is a deflecting member (oscillating member). Denoted at 92 is a torsion spring.

In an oscillating element having a comparatively simple structure in which a deflecting member 91 has only one surface such as shown in FIG. 9, the angle of the deflecting member 91 changes sinusoidally with respect to time t. When such oscillating element is used in an optical scanning device, it is necessary to collect the light beam scanningly deflected by the deflecting member 91, by means of an imaging lens (arcsine lens) having an arc sine characteristic, in order to assure constant-speed scan of the surface to be scanned (hereinafter, "scan surface") with the light beam.

The arc sine characteristic refers to such characteristic effective to collect a light beam being scanningly deflected at $\theta$ ($\theta$ is the deflection angle of the light beam scanningly deflected by the oscillating element) which is expressed by $$\theta = \theta_0 \cdot \sin(2\pi t/T)$$

toward a scan image height Y which is expressed by $$Y = a \cdot \arcsin(\theta/\theta_0) = 2\pi a t/T.$$

Here, $\theta_0$ is twofold of the maximum deflection angle of the oscillating element, T is the oscillation period of the oscillating element, and a is a constant for connecting the deflection angle $\theta$ of the light beam with the image height Y.

In this case, although constant-speed scan is enabled, the image quality deteriorates because the spot diameter on the scan surface changes from the scan center toward the scan end.

In order to keep the spot diameter constant throughout the effective scan region, the imaging lens should have an f$\theta$ characteristic. For, there is a proportional relationship between the spot diameter and the ratio dY/d$\theta$ of a change dY of the scan image height Y when the deflection angle $\theta$ of the light beam changes minutely. Hence, the f$\theta$ characteristic is synonymous with $$dY/d\theta = f (= \text{constant}).$$

By the way, in the case of arc sine characteristic, there is a relation $$dY/d\theta = (a/\theta_0)/\cos(2\pi t/T),$$

and taking that the spot diameter on the scan surface at t=0 as minimum, the spot diameter on the scan surface gradually increases as the deflective scan of the scan surface with light progresses.

If an f$\theta$ lens is used in an optical scanning device in which the deflection angle changes sinusoidally, the constant-speed scan is unattainable any more, and correction of printing positions by electric control is indispensable.

[Patent Document 1]

Japanese Laid-Open Patent Application No. 2004-191416

In consideration of this, in late years it is often that a rotary polygon mirror by which a light beam can be scanningly deflected at a constant angular speed is used in combination with an f$\theta$ lens to constitute an optical scanning device.

However, if an optical scanning device based on such combination and an optical scanning device using an oscillating element are compared with other, the followings will be suggested:

1) Comparing these only with respect to the deflecting means, the optical scanning device using an oscillating element is more advantageous in the point of manufacture; and
2) If only one imaging lens is used for downsizing the imaging optical system, the imaging lens should have a large lens thickness to keep the f$\theta$ characteristic.

In consideration of these, there may be a method in which the f$\theta$ characteristic is partly carried by the deflecting means, thereby to reduce the thickness of the imaging lens. In that case, there will be superiority as well as inferiority, because the structure using an oscillating element would have a larger degree of freedom, as compared with a rotary polygon mirror which is capable of scanningly deflecting a light beam at constant angular speed.

In order that the deflecting means having a rotary polygon mirror carries a part of the f$\theta$ characteristic, the deflecting surface of the rotary polygon mirror should have a curvature. In other words, the deflecting surface of the rotary polygon mirror should have a power in the main-scan direction.

However, if a curvature is provided in the deflection surface of the rotary polygon mirror, the convergence of the light beam being scanningly deflected in accordance with the deflection angle changes. Therefore, it causes a problem that the optical performance is unstable at different scan image heights on the scan surface, which means deterioration of the image quality. Stating it in a different way, if a curvature is provided in the deflecting surface of the rotary polygon mirror, the convergence of the light beam scanningly deflected in accordance with the deflection angle changes and, therefore, the design of the imaging optical system becomes quite difficult.

The present invention provides an optical scanning device using an oscillating element being advantageous in the point of manufacture, but free from deterioration of the image quality.

The present invention in another aspect thereof provides an image forming apparatus having such optical scanning device.

In accordance with an aspect of the present invention, there is provided an optical scanning device, comprising: light source means; deflecting means configured to scanningly deflect a light beam emitted from said light source means; and an imaging optical system configured to image the light beam scanningly deflected by said deflecting means, upon a scan surface to be scanned, wherein said deflecting means includes an oscillating element configured to reciprocally scan the scan surface with the light beam from said light source means, wherein relations $$(d\theta_{max}/dt_{max}) < (d\theta_0/dt_0)$$

$$(dY_0/d\theta_0) < (dY_{max}/d\theta_{max})$$

$$(d\theta_0/dt_0) < (d\theta_{0.5}/dt_{0.5}) \text{ and}$$

$$(dY_{0.5}/d\theta_{0.5}) < (dY_0/d\theta_0)$$

are satisfied throughout a whole effective scan region on the scan surface, where $\theta_0$ is the deflection angle of said oscillating element as the light beam scans a centre position $Y_0$ of the effective scan region on the scan surface with respect to the main-san direction, and $d\theta_0/dt_0$ is an angular speed of said oscillating element at that time, $\theta_{max}$ is a maximum deflection angle of said oscillating element as the light beam scans a maximum scan position $Y_{max}$ in the effective scan region on the scan surface with respect to the main-scan direction, and $d\theta_{max}/dt_{max}$ is the angular speed of said oscillating element at that time, $\theta_{0.5}$ is the deflection angle of said oscillating element as the light beam scans a scan position $Y_{0.5}$ corresponding to 50% of the maximum scan position $Y_{max}$ in the effective scan region on the scan surface with respect to the main-scan direction, and $d\theta_{0.5}/dt_{0.5}$ is the angular speed of said oscillating element at that time, $dY_0$ is an amount of change at the centre position $Y_0$ on the scan surface with respect to the main-scan direction, with reference to an amount of change $d\theta_0$ of said oscillating element at the deflection angle $\theta_0$, $dY_{max}$ is an amount of change at the maximum scan position $Y_{max}$ on the scan surface with respect to the main-scan direction, with reference to an amount of change $d\theta_{max}$ of said oscillating element at the maximum deflection angle $\theta_{max}$, and $dY_{0.5}$ is an amount of change at the scan position $Y_{0.5}$ on the scan surface with respect to the main-scan direction, with reference to an amount of change $d\theta_{0.5}$ of said oscillating element at the deflection angle $\theta_{0.5}$.

In one preferred form of this aspect of the present invention, a relation $$0.85 < (dY/d\theta)/(dY_0/d\theta_0) < 1.15$$

is satisfied throughout the whole effective scan region, where $\theta_0$ is the deflection angle of said oscillating element as the light beam scans the centre position $Y_0$ of the effective scan region on the scan surface with respect to the main-scan direction, $\theta$ is the deflection angle of said oscillating element as the light beam scans a scan position $Y$ in the effective scan region on the scan surface with respect to the main-scan direction, $dY_0$ is an amount of change at the centre position $Y_0$ on the scan surface with respect to the main-scan direction, with reference to an amount of change $d\theta_0$ of said oscillating element at the deflection angle $\theta_0$, and $dY$ is an amount of change at the scan position $Y$ on the scan surface, with reference to an amount of change $d\theta$ of said oscillating element at the deflection angle $\theta$.

Furthermore, a relation $$0.9 \leq (dY/dt)/(dY_0/dt_0) \leq 1.1$$

may be satisfied throughout the whole effective scan region, where $dY_0/dt_0$ is a scan speed as the light beam scans the centre position $Y_0$ of the effective scan region on the scan surface with respect to the main-scan direction, and $dY/dt$ is a scan speed as the light beam scans a scan position $Y$ in the effective scan region on the scan surface with respect to the main-scan direction.

In accordance with another aspect of the present invention, there is provided an optical scanning device, comprising: light source means; deflecting means configured to scanningly deflect a light beam emitted from said light source means; and an imaging optical system configured to image the light beam scanningly deflected by said deflecting means, upon a scan surface to be scanned, wherein said deflecting means includes an oscillating element configured to reciprocally scan the scan surface with the light beam from said light source means, wherein, when an area of an effective scan region on the scan surface from a centre position $Y_0$ of the effective scan region with respect to a main-scan direction to a maximum scan position $Y_{max}$ in the effective scan region with respect to the main-scan direction is scanned with the light beam, a value of an angular speed $d\theta/dt$ of said oscillating element at a deflection angle $\theta$ as the light beam scans a position $Y$ in the effective scan region on the scan surface with respect to the main-scan direction, increases and subsequently decreases, and wherein, a relation $$0.85 < (dY/d\theta)/(dY_0/d\theta_0) < 1.15$$

is satisfied throughout the whole effective scan region, where $\theta_0$ is the deflection angle of said oscillating element as the light beam scans the centre position $Y_0$ of the effective scan region on the scan surface with respect to the main-scan direction, $\theta$ is the deflection angle of said oscillating element as the light beam scans a scan position $Y$ in the effective scan region on the scan surface with respect to the main-scan direction, $dY_0$ is an amount of change at the centre position $Y_0$ on the scan surface with respect to the main-scan direction, with reference to an amount of change $d\theta_0$ of said oscillating element at the deflection angle $\theta_0$, and $dY$ is an amount of change at the scan position $Y$ on the scan surface, with reference to an amount of change $d\theta$ of said oscillating element at the deflection angle $\theta$.

The oscillating element may be configured to scan the scan surface so as to form an image in the effective scan region thereof based on only one of a forward stroke and a backward stroke of oscillation, and wherein, when an oscillation period of said oscillating element as a whole is denoted by T, a scan time in which the light beam scans the scan surface is not less than 0.25 T.

The imaging optical system may be comprised of a single imaging lens, and wherein, a relation $$0.01 \leq Dt/W \leq 0.04$$

is satisfied, where Dt is a largest thickness of said imaging lens, and W is a scan width on the scan surface with respect to the main-scan direction.

In accordance with a further aspect of the present invention, there is provided an image forming apparatus, comprising: an optical scanning device as recited above; a photosensitive drum disposed at a scan surface to be scanned by said optical scanning device; a developing device for developing an electrostatic latent image formed on said photosensitive drum through a light beam scanningly deflected by said optical scanning device, to produce a toner image; a transferring device for transferring the developed toner image onto a transfer material; and a fixing device for fixing the transferred toner image, on the transfer material.

In accordance with a yet further aspect of the present invention, there is provided an image forming apparatus, comprising: an optical scanning device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
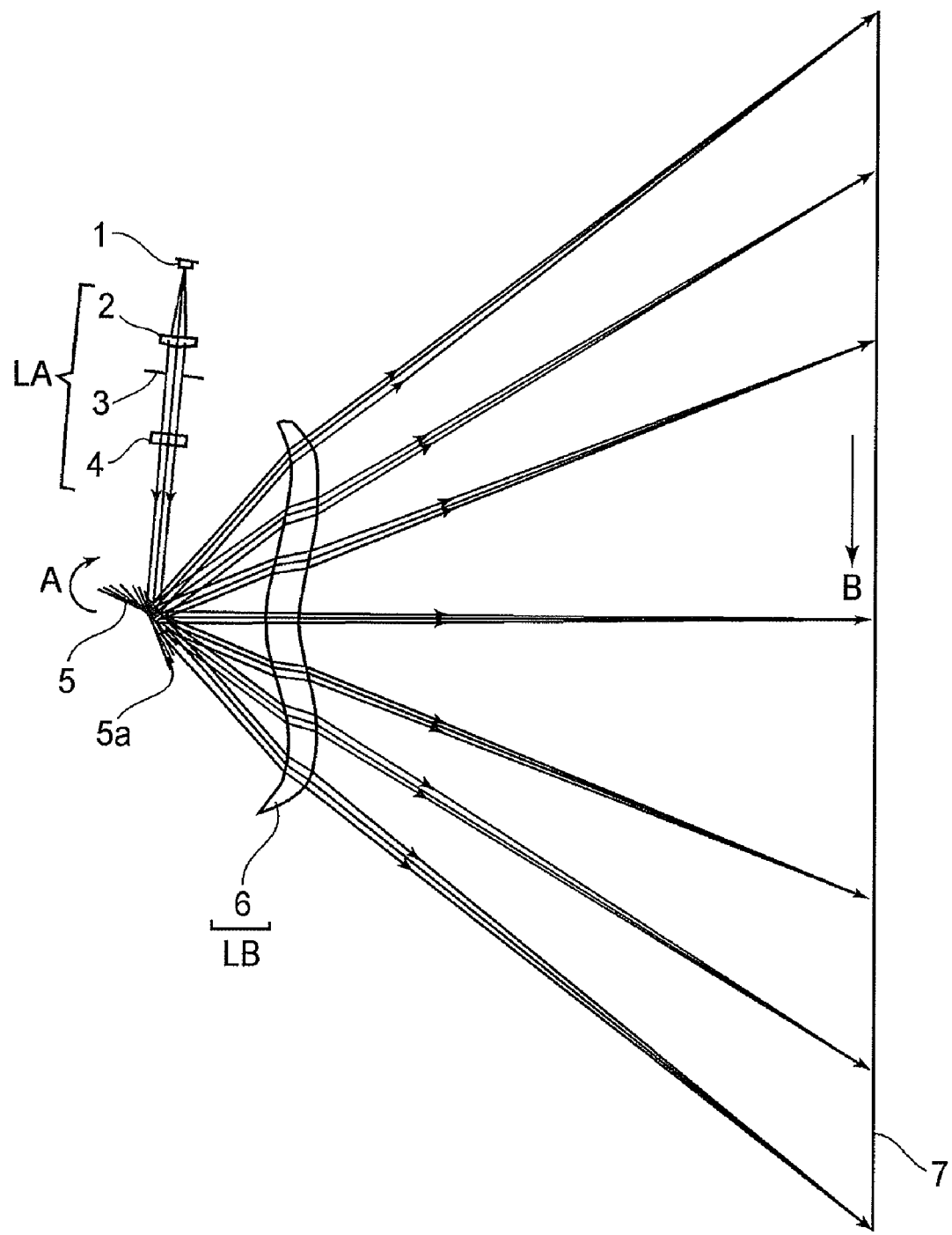
FIG. 1 is a main-scan sectional view in a first embodiment of the present invention.

FIG. 1 is a sectional view of a main portion of an optical system in a main-scan direction (scan sectional view), according to a first embodiment of the present invention.

In the following description, the term "main-scan direction" refers to a direction which is perpendicular to the oscillation axis of deflecting means and the optical axis of an imaging optical system (i.e. the direction in which the light beam is scanningly deflected by the deflecting means).

The term "sub-scan direction" refers to a direction which is parallel to the oscillation axis of the deflecting means.

Furthermore, the term "main-scan section" refers to a plane which contains the main-scan direction as well as the optical axis of the imaging optical system.

Furthermore, the term "sub-scan section" refers to a cross-section which is perpendicular to main-scan section.

Denoted in the drawing at 1 is light source means which comprises a semiconductor laser, for example. Denoted at 2 is a condenser lens (collimator lens) as a light collecting optical system, and it functions to convert a divergent light beam emitted from the light source means 1 into a convergent light beam. It should be noted that, instead of converting the incident light into convergent light, the condenser lens 2 may convert it into a parallel light beam or a divergent light beam.

Denoted at 3 is an aperture stop which functions to restrict the light beam passing therethrough to shape the beam profile. Denoted at 4 is a cylindrical lens which has a predetermined power only in the sub-scan section (sub-scan direction). It functions to image, in the sub-scan section 5, the light beam passed through the condenser lens 2 as a line image on the deflecting surface 5a of the deflecting means (optical deflector) 5, to described below. It should be noted that the condenser lens 2 and the cylindrical lens 4 may be constituted as one optical element (anamorphic lens) integrally.

Furthermore, the condenser lens 2, aperture stop 3 and cylindrical lens 4 are components of an input optical system LA.

Figure 3:
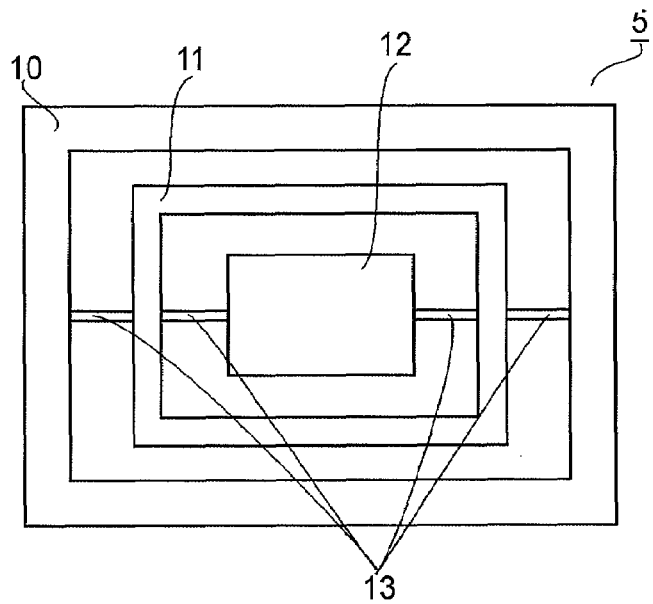
FIG. 3 is a schematic diagram of a main portion of deflecting means according to the first embodiment of the present invention.

Denoted at 5 is an oscillating element as deflecting means arranged to oscillate based on the resonance phenomenon to perform reciprocal scan. The oscillating element includes a plurality of oscillating members (deflecting surfaces) having different natural oscillation frequencies, as shown in FIG. 3, to be described below. In the present embodiment, the oscillating element 5 performs the oscillatory movement, by which the light beam incident on the oscillating member (deflecting surface) is scanningly deflected on the scan surface in the main-scan direction.

Denoted at LB is an imaging optical system which consists of a single imaging optical element (imaging lens) 6. The imaging lens 6 functions to image, in the main-scan section, the light beam based on the imagewise information, being scanningly deflected by the deflecting surface of the oscillating element 5, into a light spot on the photosensitive drum surface (scan surface) 7. Based on this, the scan surface is scanned at a constant speed by the light beam corresponding to the imagewise information.

Denoted at 7 is a photosensitive drum surface as the surface to be scanned (scan surface).

In present embodiment, the divergent light beam emitted from the semiconductor laser 1 based on the imagewise information is converted into a convergent light beam by the condenser lens 2. The light beam (light quantity) is subsequently restricted by an aperture stop 3 and, then, it is incident on a cylindrical lens 4.

Within the main-scan section, the light beam incident on the cylindrical lens 4 emits therefrom while keeping the original state thereof. Within the sub-scan section, on the other hand, the light beam is imaged as a line image (line image elongating in the main-scan direction) upon the oscillating member (deflecting surface) 5a of the oscillating element 5 as the deflecting means, which functions to perform reciprocal scan based on the resonance phenomenon.

The light beam being scanningly deflected by the oscillating member 5a of the oscillating element 5 is imaged into a light spot upon the photosensitive drum surface 7 through the imaging lens 6. By oscillating the oscillating element 5 in a direction of an arrow A (one direction), the photosensitive drum surface 7 is optically scanned at a constant speed in the direction of an arrow B (main-scan direction). Based on this, image recording is performed on the photosensitive drum surface 7 as the recording medium.

There are product optical scanning devices so far in which the spot diameter changes with reference to the scan image height. An example is an OFS (Over Filled Scanner) system in which a light beam wider than the width of the deflecting surface of deflecting means is incident within a main-scan section, the spot diameter increases as the scan progresses from the central image height toward the peripheral image height.

What is important to keep the image quality is that the spot diameter does not change steeply and the difference between the maximum and minimum of the spot diameter is kept in a moderate range. These points are taken into account even in the OFS systems, and they are manufactured as products.

Figure 2:
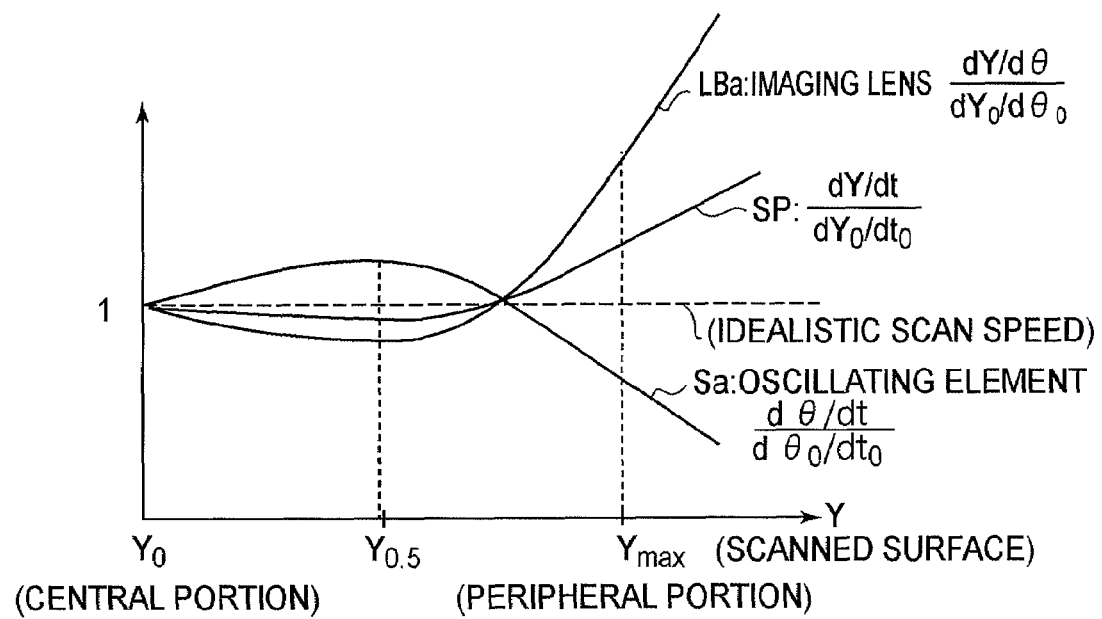
FIG. 2 is a graph illustrating the relationship of dθ/dt of an oscillating element and dY/dθ of an imaging optical system with reference to an image height Y, in a first embodiment of the present invention.

FIG. 2 is a diagram for explaining the characteristic, concerning the scan with the oscillating element 5 and the imaging lens 6 in the present embodiment.

Now, a symbol $\theta$ denotes the deflection angle of the oscillating element 5 as defined in the main-scan section when the light beam from the oscillating element 5 scans the scan position Y, in the main-scan direction, within the effective scan region (effective scan range). A symbol t denotes the time moment.

Furthermore, a symbol $d\theta$ denotes the amount of change of the deflection angle $\theta$ corresponding to the amount of change dt of the time t, and a symbol dY denotes the amount of change at the scan position corresponding to the amount of change $d\theta$.

Furthermore, a symbol $Y_0$ denotes the scan position when the scanning center is scanned, while the time moment is denoted by $t_0$ and the deflection angle is denoted by $\theta_0$.

A symbol $Y_{max}$ denotes the scan position when the maximum position of the effective scan region (effective scan range) is scanned, while the time moment is denoted by $t_{max}$ and the deflection angle is denoted by $\theta_{max}$.

A symbol $Y_{0.5}$ denotes the scan position when a position corresponding to 50% of the maximum position of the effective scan range is scanned, while the time moment is denoted by $t_{0.5}$ and the deflection angle is denoted by $\theta_{0.5}$.

In FIG. 2, the axis of abscissas shows the range from the centre position $Y_0$ (central portion) of the effective scan range to the maximum scan position $Y_{max}$.

Curve Sa concerns the angular speed $d\theta/dt$ of the oscillating element 5, and it is expressed by $(d\theta/dt)/(d\theta_0/dt_0)$.

Curve LBa illustrates the scan of the scan surface 7 with a light beam through the imaging lens 6. Here, the curve LBa concerns the ratio dY/d$\theta$ where dY denotes the amount of change of the scan position Y corresponding to the amount of change $d\theta$ as the deflection angle of the oscillating element 5 is $\theta$. The curve is expressed with reference to $(dY/d\theta)/(dY_0/d\theta_0)$.

Curve SP concerns the scanning speed dY/dt of the light beam upon the scan surface 7, and it is expressed by $(dY/dt)/(dY_0/d\theta_0)$.

Now, a symbol $\theta_0$ denotes the deflection angle of the oscillating element 5 when the light beam scans the center $Y_0$ on the scan surface 7, and a symbol $d\theta_0/dt_0$ denotes the angular speed of the oscillating element 5 at that time.

A symbol $\theta_{max}$ denotes the deflection angle of the oscillating element 5 when the light beam scans the maximum scan position $Y_{max}$ in the effective scan region upon the scan surface 7, and a symbol $d\theta_{max}/dt_{max}$ denotes the angular speed of the oscillating element 5 at that time.

A symbol $\theta_{0.5}$ denotes the deflection angle of the oscillating element 5 when the light beam scans the scan position $Y_{0.5}$ corresponding to 50% of the maximum scan position $Y_{max}$ in the effective scan region upon the scan surface 7, and a symbol $d\theta_{0.5}/dt_{0.5}$ denotes the angular speed of the oscillating element 5 at that time.

A symbol $\theta$ denotes the deflection angle of the oscillating element 5 when the light beam scans the scan position Y in the effective scan region on the scan surface 7.

A symbol $dY_0$ denotes the amount of change at the central position $Y_0$ (scan position Y0) on the scan surface 7, with reference to the amount of change $d\theta_0$ at the deflection angle $\theta_0$ of the oscillating element 5.

A symbol $dY_{max}$ denotes the amount of change at the scan position $Y_{max}$ on the scan surface 7, with reference to the amount of change $d\theta_{max}$ at the maximum deflection angle $\theta_{max}$ of the oscillating element 5.

A symbol $dY_{0.5}$ denotes the mount of change at the scan position $Y_{0.5}$ on the scan surface 7, with reference to the amount of change $d\theta_{0.5}$ at the deflection angle $\theta_{0.5}$ of the oscillating element 5.

A symbol dY denotes the amount of change at the scan position Y on the scan surface 7, with reference to the amount of change $d\theta$ at the deflection angle $\theta$ of the oscillating element 5.

A symbol $dY_0/dt_0$ denotes the scanning speed when the light beam scans the centre position $Y_0$ (scan position $Y_0$) on the scan surface 7.

A symbol dY/dt denotes the scanning speed when the light beam scans the scan position Y within the effective scan region on the scan surface 7.

In FIG. 2, as the scan position displaces from the centre position $Y_0$ in the main-scan direction of the effective scan region on the scan surface 7 toward the maximum scan position $Y_{max}$ in the main-scan direction of the effective scan region on the scan surface 7, the curve Sa goes up and then takes an extreme value, and goes down afterwards.

Namely, In FIG. 2, as the scan position displaces from the centre position $Y_0$ on the scan surface 7 toward the maximum scan position $Y_{max}$ on the scan surface 7, the value of $(d\theta/dt)/(d\theta_0/dt_0)$ increases and then takes an extreme value at the scan position Y0.5, and it decreases afterwards.

In other words, in the present embodiment, when an area on the scan surface 7 from the centre position $Y_0$ to the maximum scan position $Y_{max}$ is scanned with the light beam, the value of angular speed $d\theta/dt$ of the oscillating element 5 with a deflection angle $\theta$ once increases, and it decreases afterwards.

Hence, in the present embodiment, the following conditions are satisfied:

$$(d\theta_{max}/dt_{max}) < (d\theta_0/dt_0) \tag{1}$$

$$(dY_0/d\theta_0) < (dY_{max}/d\theta_{max}) \tag{2}$$

$$(d\theta_0/dt_0) < (d\theta_{0.5}/dt_{0.5}) \tag{3}$$

$$(dY_{0.5}/d\theta_{0.5}) < (dY_0/d\theta_0) \tag{4}$$

$$0.85 < (dY/d\theta)/(dY_0/d\theta_0) < 1.15 \tag{5}$$

$$0.9 \leq (dY/dt)/(dY_0/dt_0) \leq 1.1 \tag{6}$$

The conditional expression (1) means that the angular speed $d\theta/dt$ of the oscillating element 5 becomes slower when the maximum scan position $Y_{max}$ (end of the effective scan region) is scanned, as compared with that when the scanning center $Y_0$ on the scan surface 7 is scanned (deflection angle $\theta_0$).

The conditional expression (2) means that, concerning the positional change dY/d$\theta$ on the scan surface 7 of the light beam passed through the imaging lens 6, the amount of change of the scan position when the scan center is scanned (deflection angle $\theta_0$) is smaller than the amount of change when the maximum scan position is scanned.

The conditional expression (3) means that the angular speed $d\theta/dt$ of the oscillating element 5 becomes faster when the position corresponding to 50% of the maximum scan position $Y_{max}$ is scanned, than that when the scan center $Y_0$ on the scan surface 7 is scanned (deflection angle $\theta_0$).

The conditional expression (4) means that, concerning the positional change $dY/d\theta$ on the scan surface 7 of the light beam passed through the imaging lens 6, the amount of change of the scan position when the scan center is scanned (deflection angle $\theta_0$) is larger than the amount of change when the position $Y_{0.5}$ corresponding to 50% of the maximum scan position $Y_{max}$ is scanned.

The conditional expression (5) specifies the difference between the size of the spot diameter at the central $Y_0$ of the effective scan region and the size of the spot diameter at an arbitrary scan position Y in the effective scan region.

The conditional expression (6) specifies the difference between the scanning speed when the centre position $Y_0$ (scan position $Y_0$) on the scan surface 7 is scanned with the light beam and the scanning speed when an arbitrary scan position Y in the effective scan region is scanned.

By satisfying conditional expressions (1), (2), (3) and (4) or, alternatively, by satisfying conditional expressions (1), (2) and (5), constant-speed scan of the surface 7 can be accomplished easily.

Furthermore, an excessive variation of the spot diameter on the scan surface is avoided to reduce occurrences of density unevenness, to prevent printing-quality deterioration.

Furthermore, by satisfying conditional expression (6), it is assured that the surface 7 is scanned at constant speed with the light beam from the oscillating element 5 passed through the imaging lens 6.

In this embodiment, by satisfying the conditional expressions mentioned above, a moderate fθ characteristic is assigned to both of the oscillating element 5 and the imaging lens 6.

In the present embodiment, for the control not to keep the angular speed of the deflection angle of the deflecting means constant, it will be best to use the oscillating element 5 in the deflecting means. On the other hand, if a rotary polygon mirror is used in the deflecting means, the rotational speed should be changed in accordance with a particular pattern, or a curvature should be formed in the deflecting surface. However, changing the rotational speed of a rotary polygon mirror, rotating at a high speed greater than 2000 [1/sec], so as to follow a special pattern during one scan is very difficult. Furthermore, if a curvature is provided in the deflecting surface depending on the image height (scan position in the main-scan direction) upon the scan surface so as to change the angular speed of the deflection angle of the light beam, the deflecting means would be undesirably upsized. Even if the problem of upsizing can be overcome in some way, it is still necessary to provide a curvature in the deflecting surface to make a convex surface, in order to retard the angular speed of the deflection angle of the light beam at the maximum scan position $Y_{max}$ (end) of the effective scan region on the scan surface. Here, comparing the convergence of light beams before and after being deflected by deflecting surface of the deflecting means, the convergence is so changed nearly into parallel light or divergent light. Therefore, the imaging optical system requires a much stronger power and a larger lens thickness. This causes problems in manufacture.

In the present embodiment, when the surface 7 is scanned with a light beam using the oscillating element 5 as the deflecting means, the optical scan is carried out only in one of the forward stroke and backward stroke of the oscillation.

If reciprocal scan is carried out over the scan surface 7 with a light beam, the scanning line spacing would become quite unstable, getting wider or narrower among individual scan lines, to cause a serious problem of printing quality. In other words, if reciprocal scan is carried out over the scan surface 7 with the light beam, the problem that scanning line spacing differs in individual scanning lines becomes quite notable.

In the present embodiment, if the oscillation period of the whole oscillating element 5 is denoted by T, the scanning time in which the light beam scans over the scan surface 7 is not shorter than 0.25 T.

Here, if an oscillating element which is represented by $$\theta = \theta_0 \cdot \sin(2\pi t/T)$$

is used where θ denotes the deflection angle of the light beam defined in the main-scan section, it is required to complete the printing within the time duration not less than −0.082 T and not greater than +0.082 T, in order to satisfy the conditional expressions mentioned hereinbefore. Here, $\theta_0$ is twofold of the maximum deflection angle of the oscillating element, and t is time and T denotes the oscillation period of the whole oscillating element.

Therefore, in order to control deterioration of the printing quality by using conventional oscillating elements, the printing should be done only in the time duration corresponding to 16.4% of one period.

Hence, in order to have a good use of conventional oscillating elements, the deflection angle $\theta_0$ has to be enlarged to obtain an enough deflection angle or, alternatively, the distance (optical path length) from the deflecting surface to the scan surface has to be enlarged to assure that the whole region of the effective scan region is scanned with a small deflection angle.

However, if the deflection angle $\theta_0$ is enlarged, structurally it results in prolongation of the oscillation period T, causing a problem that the scanning speed becomes slower. Furthermore, if the distance (optical path length) from the deflecting surface to the scan surface is enlarged, it causes a problem that the total size of the optical scanning device increases.

In consideration of these, in the present embodiment, a nest-like oscillating element 5 such as shown in FIG. 3 is used to assure constant-speed light-beam deflection and to enable a printing operation in the time duration corresponding to 30% or more of one period.

FIG. 3 is a schematic diagram of a main portion of the oscillating element 5 as the deflecting means used in the present embodiment.

In the present embodiment, the oscillating element 5 of nest-like structure such as shown in FIG. 3 is used to provide the deflecting means with moderate fθ characteristic while satisfying the conditional expressions mentioned hereinbefore.

This oscillating element 5 includes a fixed member 10 outward, a first oscillating member 11 oscillating at a fundamental frequency and placed inside the fixed member, and a second oscillating member 12 which has a natural oscillation frequency twofold of the natural oscillation frequency of the first oscillating member 11 and oscillates with a frequency twofold of the fundamental frequency. The second oscillating element is placed inside the first oscillating member.

Furthermore, the fixed member 10 and the first oscillating member 11 as well as the first oscillating member 11 and second oscillating member 12 are respectively coupled with each other by a torsion bar 13 which comprises a plurality of elastic members. All torsion bars 13 are provided along the same straight line (same direction), and these function to oscillate the first and second oscillating members 11 and 12 with an arbitrary amplitude when a magnetic force is applied to the oscillating element 5. By applying this amplitude appropriately, the fθ characteristic is accomplished in the oscillating element 5.

Furthermore, high-speed deflection scan is realized by oscillating the first oscillating member 11 and the second oscillating member 12 at around the resonance frequency.

Furthermore, the fixed member 10 and the first oscillating member 11 as well as the first oscillating member 11 and the second oscillating member 12 are respectively coupled with each other by means of plural torsion bars. If these torsion bars comprising elastic members are replaced by a single torsion bar, a cantilever-like structure results which might cause oscillation in an unintended direction. This is undesirable since possibly the light beam cannot scan particular points any more.

Now, it is assumed that the deflection angle θ1 of the first oscillating member 11 is expressed by $$\theta 1 = \phi 1 \cdot \sin(\omega t)$$

and the deflection angle θ2 of the second oscillating member 12 taking the attitude of the first oscillating member 11 as a reference is expressed by $$\theta 2 = -\phi 2 \cdot \sin(2\omega t)$$

wherein
 φ1 denotes the maximum deflection angle of the first oscillating member 11,
 φ2 denotes the maximum deflection angle of the second oscillating member 12,
 ω denotes the angular speed of the first oscillating member 11, and
 t is time.

As shown in FIG. 3, since the fixed member 10, first oscillating member 11 and second oscillating member 12 are coupled together along a straight line by means of torsion bars 13 which are elastic members, the deflection angle θ11 of the second oscillating member 12 with reference to the fixed member 10 can be expressed as $$\theta 11 = \phi 1 \cdot \sin(\omega t) - \phi 2 \cdot \sin(2\omega t).$$

Also, the angular speed ω11 of the deflection angle of the second oscillating member 12 can be expressed as $$\omega 11 = \omega \{\phi 1 \cdot \cos(\omega t) - 2\phi 2 \cdot \cos(2\omega t)\}.$$

Figure 4:
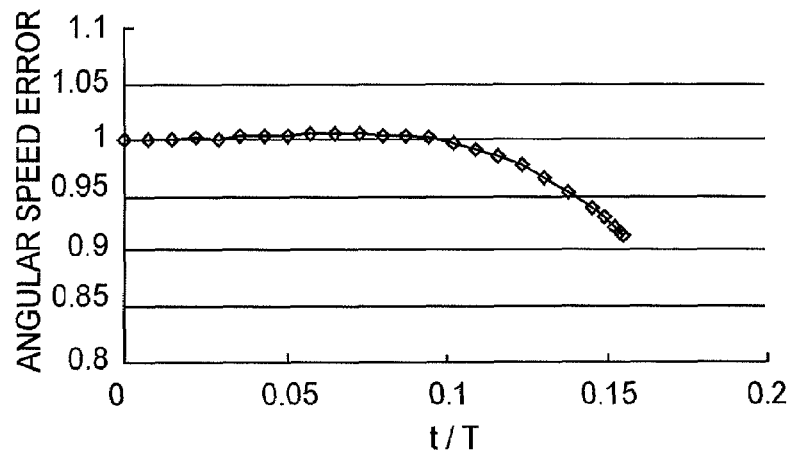
FIG. 4 is a graph illustrating errors in the deflection angle of a second oscillating member with respect to time, in the first embodiment of the present invention.

In the present embodiment, if φ1=36.13 deg., φ2=4.95 deg. and ω=1*10⁴*π [rad/sec] (5 kHZ if converted in terms of frequency), the angular speed of the second oscillating member 12 will be such as shown in FIG. 4.

In FIG. 4, the axis of abscissas denotes t/T (where T is the oscillation period 0.2 msec of the first oscillating member 11), and the axis of ordinate denotes the angular-speed error value (rate) of the angular speed ω11(t) of the second oscillating member 12 at arbitrary time t, with reference to the angular speed ω11 (t=0) of the second oscillating member 12 at time t=0.

More specifically, the angular-speed error value of the axis of ordinate of FIG. 4 means "(the angular speed ω11(t) of the second oscillating member 12 at an arbitrary time moment t) divided by (the angular speed ω11(t=0) of the second oscillating member 12 at time t=0)".

In FIG. 4, when the angular-speed error value (rate) is equal to 1 in the whole region of time domain t/T, it shows that the angular speed is constant regardless of time. Furthermore, the point t/T±0.25 defines the turn timing of the first oscillating member 11. If the printing is carried out only by one-direction scan, the scan exceeding the point t/T±0.25 is no more possible.

In this embodiment, the time domain t/T to be used for the printing is made not less than −0.155 and not greater than +0.155. Based on this, the difference value [%] of the angular-speed error with reference to the angular speed of the second oscillating member 12 at time t=0 becomes not less than −8.7% and not greater than +0.6%.

Hence, in the present embodiment, the difference value [%] of the angular-speed error is controlled with a drift of ±10% or less, within the range of the time domain t/T used for the printing. Thus, the present embodiment has accomplished an advantageous result that the angular speed is held fixed in the time domain t/T used for the printing.

As compared therewith, if a conventional sinusoidal vibration element having only one oscillating member is used, in the time domain t/T the difference value [%] of the angular-speed error becomes not less than −43.8% and not greater than 0%. This means a problem that the angular speed cannot be held constant.

When there is no optical system all over the optical path after the oscillating element 5 as the deflecting means for deflecting a light beam at constant angular-speed, the scanning speed of the light beam on the scan surface cannot be constant. As the light beam nears the periphery of the effective scan region (image active area) on the scan surface, the scanning speed becomes fast. Therefore, in order to carry the fθ characteristic on the oscillating element 5, the angular speed of the oscillating element 5 should be slowed down as the light beam nears the periphery of the effective scan region (image active area) on the scan surface.

In the present embodiment, the angular speed is slowed down at points in the time domain for the printing, not less than 0.08 and not greater than 0.155. Based on this, the fθ characteristic is partly carried on the oscillating element 5.

Furthermore, in the case of the present embodiment, in the range of the time domain t/T for the printing not less than −0.155 and not greater than +0.155, the second oscillating member 12 oscillates with an angle in a range of not less than −25.28 deg. and not greater than +25.28 deg. Therefore, the width of the deflection angle of the light beam defined in the main-scan section (light rays) is 50.56*2=101.12 deg. Hence, it can be said that an enough angle is provided.

If the width of the deflection angle of the light beam (light rays) becomes smaller than 80 deg., the optical path length (distance) from the oscillating element 5 to the scan surface 7 becomes long, and the size of the optical scanning device as a whole grow large. Furthermore, it becomes difficult to satisfy the aforementioned conditional expressions with the oscillating element 5 having a double-structure oscillating member, to secure a width of 160 deg. of the deflection angle of the light beam (light rays). It becomes necessary to use an oscillating element having more complicated mechanism. This is undesirable because it raises problems in manufacture.

In this embodiment, the deflection angle θ of the light beam scanningly deflected by the deflecting surface of the oscillating element 5 is set to be not less than 80 deg. and not greater than 160 deg.

Furthermore, the imaging lens 6 of the present embodiment is set so as to scan the light beam at constant speed on the scan surface 7, the angular speed of the deflection angle of which light beam changes in the time domain t/T used for the printing as described above.

Generally, where an imaging optical system is constituted by one piece of imaging lens, the thickness of the imaging lens 6 becomes large to keep the fθ characteristic. This is unfavorable because of difficulties in manufacture.

In consideration of this, in the present embodiment, the thickness of the imaging lens 6 is thinned to 6 mm or less by partly carrying the fθ characteristic on the oscillating element 5 and by making the light beam emitted from the condenser lens 2 into a convergent light beam in the main-scan section. Based on this, downsizing and light-weighting of the optical scanning device as a whole are attempted.

In this embodiment, when the maximum thickness of the imaging lens 6 is denoted by Dt and the scan width (effective scan range) on the scan surface 7 in the main-scan direction is denoted by W, a condition:

$$0.01 \leq Dt/W \leq 0.04 \tag{7}$$

is satisfied.

The conditional expression (7) concerns the ratio between the largest thickness t of the imaging lens 6 and scan width W. If the upper limit of the conditional expression (7) is exceeded, the downsizing and the light-weighting effect of the optical scanning device as a whole is undesirably reduced by half. Furthermore, if the lower limit of the conditional expression (7) is not reached, it becomes quite difficult to design to obtain the fθ characteristic required for the imaging lens 6, although the fθ characteristic is partly carried on the oscillating element 5.

It is to be noted that the conditional expression (7) mentioned above should more desirably be set as follows.

$$0.015 \leq Dt/W \leq 0.035 \tag{7a}$$

Figure 5:
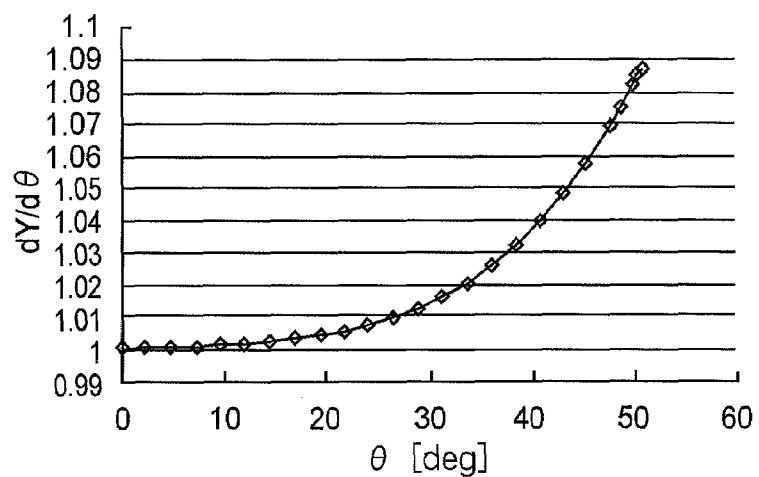
FIG. 5 a graph illustrating the relationship of the deflection angle of a light beam in the imaging optical system with dY/dθ in the first embodiment of the present invention.

FIG. 5 is a graph showing the relationship between the deflection angle θ of the light beam in the first embodiment of the present invention and the scan position Y on the scan surface in the main-scan direction.

The axis of ordinate of FIG. 5 denotes the positional change dY/dθ on the scan surface 7 of the light beam passed through the imaging lens 6, and the axis of abscissas denotes the deflection angle θ of the oscillating element 5.

In FIG. 5, if the curve is straight, it means an idealistic state of the fθ characteristic on the scan surface.

In FIG. 5 according to the first embodiment, in the region where the deflection angle fθ of the oscillating element 5 is large, it is above the tangent line at the point θ=0. Hence, it is seen that there is such tendency that, relative to an optical element having an ordinary fθ characteristic, the light beam goes toward the end side of the effective scan region (image active area) on the scan surface 7.

Figure 6:
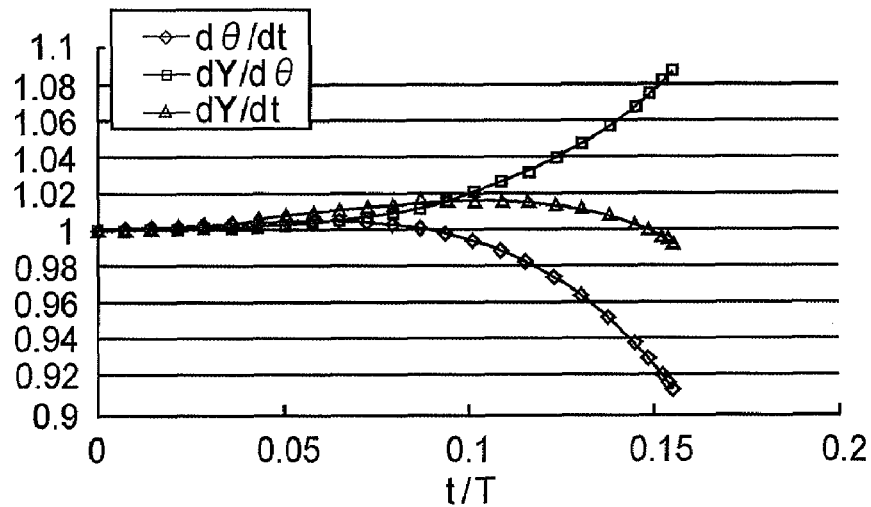
FIG. 6 is a graph illustrating the relationship of characteristics with respect to time, in the first embodiment of the present invention.

FIG. 6 is a graph showing the relationship of the angular speed dθ/dt of the oscillating element 5 and the positional change dY/dθ on the scan surface 7 of the light beam passed through the imaging lens 6, with respect to t/T, in the first embodiment of the present invention. Also, FIG. 6 is a graph showing the relationship of the scan speed dY/dt as the light beam scans the scan position Y in the main-scan direction within the effective scan region, with respect to t/T in the first embodiment of the present invention.

The value of dθ/dt in FIG. 6 increases as t/T grows large from t/T=0. It takes the extreme value at t/T=0.1, and it decreases afterwards. The value of dY/dθ in FIG. 6 increases monotonously as t/T grows large from t/T=0.

It is seen from FIG. 6 that the present embodiment uses a combination of an oscillating element 5 having an angular speed dθ/dt which becomes slower as t/T grows large, and an imaging lens 6 in which dY/dθ grows large as t/T grows large.

Therefore, it is seen that that the light beam performs constant-speed scan at a scanning speed dY/dt with an error of ±2% or less, in the effective scan region on the scan surface 7.

The error in the constant speed corresponds to a partial magnification, on the scan surface 7, of a conventional imaging optical system having a rotary polygon mirror and a fθ characteristic. If the error of constant speed goes over ±3% in the effective scan region, it becomes quite notable that printed image is expanded or contracted at some positions, and it is very unfavorable.

Embodiment 2

Figure 10:
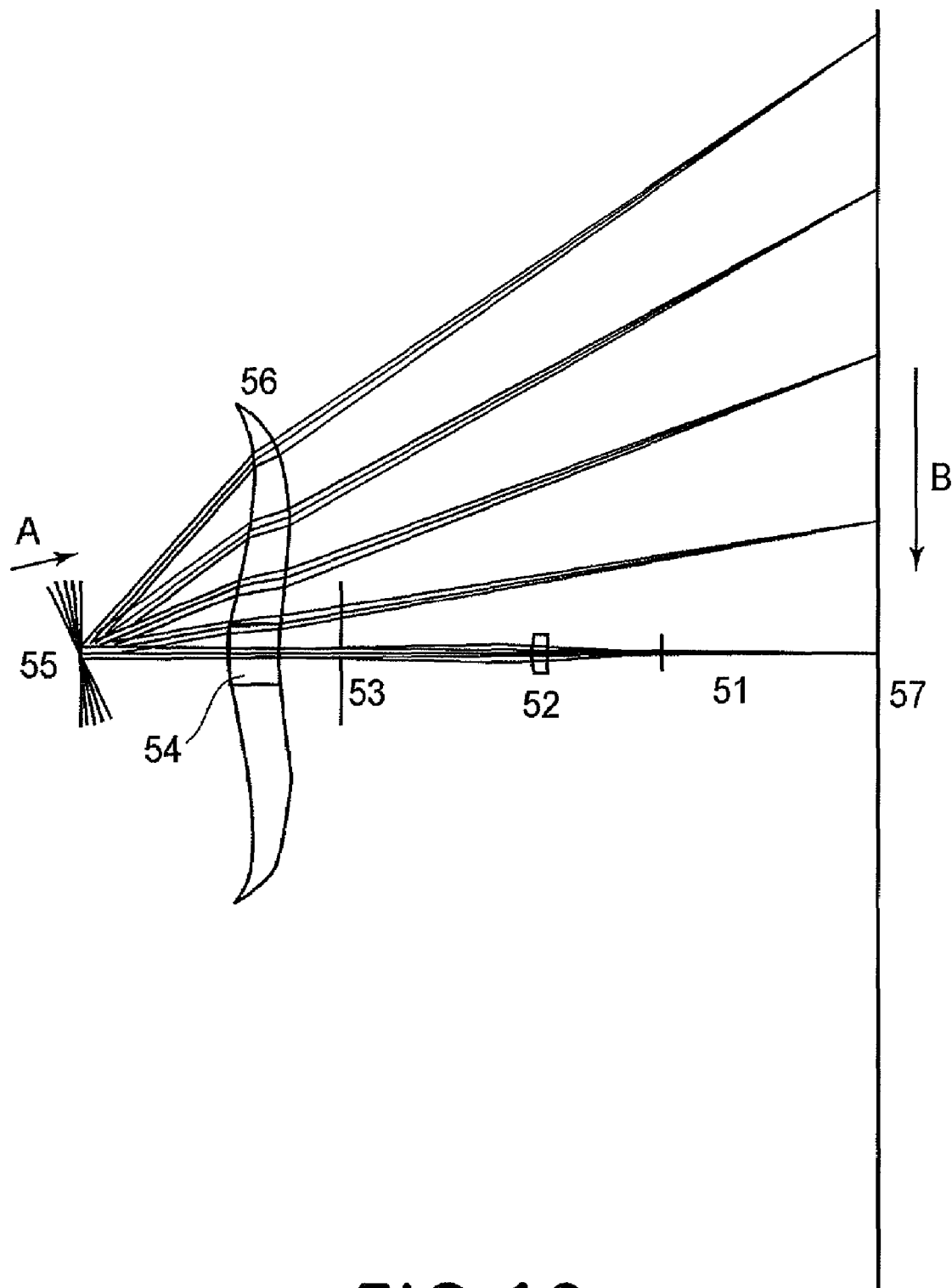
FIG. 10 is a main-scan sectional view of an optical scanning device according to a second embodiment of the present invention.

FIG. 10 is a main-scan sectional view along the main-scan direction of an optical scanning device according to a second embodiment of the present invention.

Denoted in the drawing at 51 is a semiconductor laser as light source means. Denoted at 52 is a condenser lens (collimator lens) as a collecting optical system. It functions to convert a divergent light beam emitted from the light source means 51 into a convergent light beam. It is to be noted that the condenser lens 52 may convert the incident light flux into a parallel light beam or a divergent light beam, as well as a convergent light beam.

Denoted at 53 is an aperture stop which functions to restrict a light beam passing therethrough to shape the beam profile. Denoted at 54 is a cylindrical lens which has a predetermined power only the in sub-scan direction. It functions to image the light beam passed through the condenser lens 52 as a line image on the deflecting surface 55a of the deflecting means (optical deflector) 55 to be described below, in the sub-scan section.

Denoted at 55 is an oscillating element as the deflecting means which oscillates based on the resonance phenomenon, like the first embodiment. There are a plurality of oscillating members 55 having different natural oscillation frequencies, as shown in FIG. 3. In the present embodiment, deflection scan of the light beam in the main-scan direction incident on the oscillating member is carried out based on the oscillatory motion of the oscillating element 55.

Denoted at 56 is a single imaging lens that constitutes an imaging optical system. The imaging lens 56 functions to image the light beam based on the imagewise information and being deflected and scanned by the deflecting surface of the oscillating element 55, into a light spot in the main-scan section on the photosensitive drum surface 57 as the scan surface. Denoted at 57 is the photosensitive drum surface as the scan surface.

In this embodiment, the divergent light beam emitted from the semiconductor laser 51 based on the imagewise information is converted into a convergent light beam by the condenser lens 52, and the light beam is restricted by an aperture stop 53 and is incident on a cylindrical lens 54. The cylindrical lens 6 has a power only in the sub-scan direction.

In the main-scan section, the light beam incident on the cylindrical lens 54 goes out of the same while being unchanged. On the other hand, in the sub-scan section, the light beam is imaged on the oscillating member 55a of the oscillating element 55 as a line image elongating in the main-scan direction.

The light beam being scanningly deflected by the oscillating member (deflecting surface) 55a of the oscillating element 55 is imaged into a light spot shape upon the photosensitive drum 57 through the imaging lens 56. Furthermore, by oscillating the oscillating member (deflecting surface) 55a of the oscillating element 55 is the main-scan direction, the photosensitive drum 57 is scanned with the light beam at a constant speed in the main-scan section.

It is to be noted that the image recording is performed only when it oscillates in the direction of an arrow A (one direction) and, at that time, the light beam scans the photosensitive drum 57 in the direction of an arrow B. Based on this, image recording is performed on the photosensitive drum surface 57 which is a recording medium.

Optical design parameters in the present (second) embodiment are shown in Table 1 below. In Table 1, "No." denotes the surface numbering; Ry denotes the radius of curvature (mm) in the main-scan direction; Rz denotes the radius of curvature (mm) in the sub-scan direction; D denotes the surface spacing (mm); Glass denotes the material; and N denotes the refractive index.

The meridional shape of the imaging lens 56 can be defined by the following expression, when the optical-axis direction is denoted by X and the main-scan direction is denoted by Y.

$$X = \frac{\frac{Y^2}{R}}{1+\sqrt{1-(1+K_y)\left(\frac{Y}{R}\right)^2}} + B_2Y^2 + B_4Y^4 +$$
$$B_6Y^6 + B_8Y^8 + B_{10}Y^{10} + B_{12}Y^{12} + B_{14}Y^{14} + B_{16}Y^{16}$$

wherein Ry is the curvature radius in the main-scan direction on the optical axis, and K, B4, B6, B8, . . . B16 are aspherical surface coefficients.

Furthermore, the sagittal direction corresponding to the sub-scan direction is defined by the following equation.

$$S = \frac{\frac{Z^2}{r'_z}}{1+\sqrt{1-\left(\frac{Z}{r'_z}\right)}} + \sum_{j=o}^{16}\sum_{k=1}^{8} M_{j\_k} u Y^j Z^k$$

Here, S denotes the sagittal shape defined in the plane which contains a normal to the meridional in each position in the meridional direction and which is perpendicular to the main-scan surface.

The curvature radius (sagittal curvature radius) Rz' in the sub-scan direction at a position spaced by Y from the optical axis in the main-scan direction is defined by the following equation.

$$\frac{1}{Rz'} =$$
$$\frac{1}{Rz} + E_2Y^2 + E_4Y^4 + E_6Y^6 + E_8Y^8 + E_{10}Y^{10} + E_{12}Y^{12} + E_{14}Y^{14} + E_{16}Y^{16}$$

wherein Rz denotes the sagittal curvature radius on the optical axis, and E2, E4, E6, E8, . . . E16 are coefficients of sagittal variation.

TABLE 1

(Numerical Example of Embodiment 2)

Optical Arrangement 1

| | No. | Ry | Rz | D | Glass | n (λ = 0.79) |
|---|---|---|---|---|---|---|
| Light Source | 1 | | | 0.50 | | |
| Cover Glass | 2 | infinite | | 0.25 | bsl7 | |
| | 3 | infinite | | 18.73 | | |
| Condensing | 4 | infinite | | 3.00 | lah66 | 1.7614 |
| Lens | 5 | −15.216 | | 32.52 | | |
| Stop | 6 | infinite | | 11.09 | | |
| Cylindrical | 7 | infinite | −17.958 | 8.50 | Zeonex | 1.5240 |
| Lens | 8 | infinite | | 25.41 | | |
| Deflecting Surface | 9 | infinite | | 25.52 | | |
| Imaging lens | 10 | 33.653 | −10.709 | 8.50 | Zeonex | 1.5240 |
| | 11 | 43.865 | −7.614 | 102.80 | | |
| Scan Surface | 12 | | | | | |

Aspherical Coefficients

| | | | | Aspherical Coefficient 2 (M_ik) | |
|---|---|---|---|---|---|
| Aspherical Coefficient | | | No. 11 | | |
| | No. 10 | No. 11 | j/k | 1 | 4 |
| k | −11.879 | −21.124 | 0 | 0.00E+00 | 9.35E−05 |
| B4 | −4.89E−06 | −6.66E−06 | 2 | −5.2E−06 | −2.1E−07 |
| B6 | 2.43E−09 | 3.95E−09 | 4 | 1.32E−08 | 3.05E−10 |
| B8 | 7.70E−14 | −1.87E−12 | 6 | −8.1E−12 | −2.7E−13 |
| B10 | −2.59E−16 | 1.47E−16 | 8 | 1.12E−15 | 9.66E−17 |
| B12 | −2.02E−19 | 7.85E−19 | | | |
| B14 | −5.36E−23 | −6.26E−22 | | | |
| B16 | 6.86E−26 | 1.21E−25 | | | |
| E2 | 3.85E−04 | 2.49E−04 | | | |
| E4 | −1.06E−06 | −7.14E−07 | | | |
| E6 | 2.53E−09 | 1.72E−09 | | | |
| E8 | −4.19E−12 | −2.55E−12 | | | |
| E10 | 4016E−15 | 2.15E−15 | | | |
| E12 | −2.24E−18 | −9.58E−19 | | | |
| E14 | 5.59E−22 | 1.92E−22 | | | |
| E16 | −3.85E−26 | −8.69E−27 | | | |

Optical Arrangement 2
Position and Normal Direction of Major Surfaces (Direction Cosine)

| | No. | X | Y | Z | kx | ky | kz |
|---|---|---|---|---|---|---|---|
| Light Source | 1 | 99.86 | 0 | −5.23 | −0.99863 | 0 | 0.05234 |
| Condensing | 4 | 80.41 | 0 | −4.21 | −0.99863 | 0 | 0.05234 |
| Lens | 5 | 77.42 | 0 | −4.06 | −0.99863 | 0 | 0.05234 |
| Stop | 6 | 44.94 | 0 | −2.36 | −0.99863 | 0 | 0.05234 |
| Cylindrical | 7 | 33.86 | 0 | −1.77 | −0.99863 | 0 | 0.05234 |
| Lens | 8 | 25.37 | 0 | −1.33 | −0.99863 | 0 | 0.05234 |
| Deflecting Surface | 9 | 0.00 | 0 | | | | |
| Imaging lens | 10 | 25.52 | 0 | 1.16 | −0.99993 | 0 | −0.01222 |
| | 11 | 34.02 | 0 | 1.06 | −0.99993 | 0 | −0.01222 |
| Scan Surface | 12 | 136.82 | 0 | 0.00 | 1 | 0 | 0 |

Figure 12:
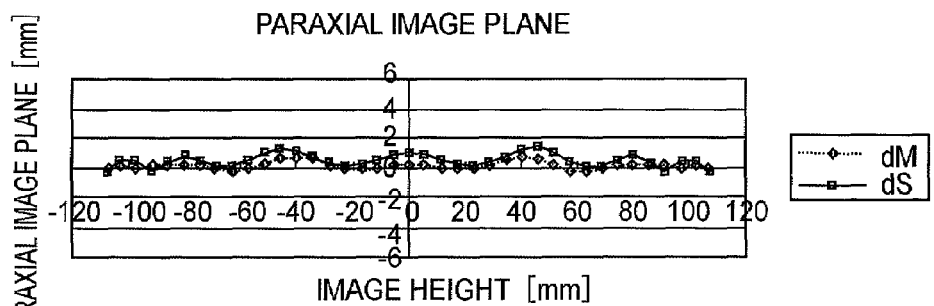
FIG. 12 is a graph illustrating the field curvature in the main-scan direction and the field curvature the sub-scan direction, in the second embodiment of the present invention.

FIG. 12 shows the field curvature in the main-scan direction and field curvature in the sub-scan direction, in the present embodiment. The axis of abscissas of FIG. 12 denotes the image height (mm) showing the scanning position in the main-scan direction, and the axis of ordinate denotes the paraxial image surface (mm).

Denoted by dM is the field curvature in the main-scan direction, and denoted by dS is the field curvature in the sub-scan direction.

Figure 13:
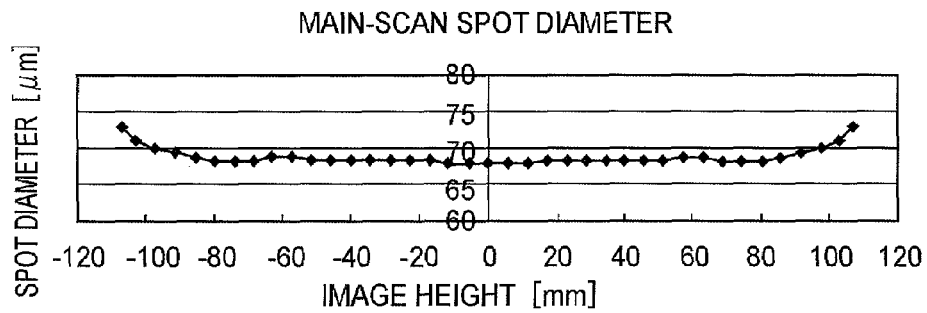
FIG. 13 is a graph illustrating the spot diameter on a scan surface, in of the main-scan direction, according to the second embodiment of the present invention.

FIG. 13 shows the spot diameter on the scanned surface 7 in the main-scan direction. The axis of abscissas of FIG. 13 shows the image height (mm) corresponding to the scanning position in the main-scan direction, and the axis of ordinate of FIG. 13 shows the spot diameter (μm) in the main-scan direction.

Figure 11:
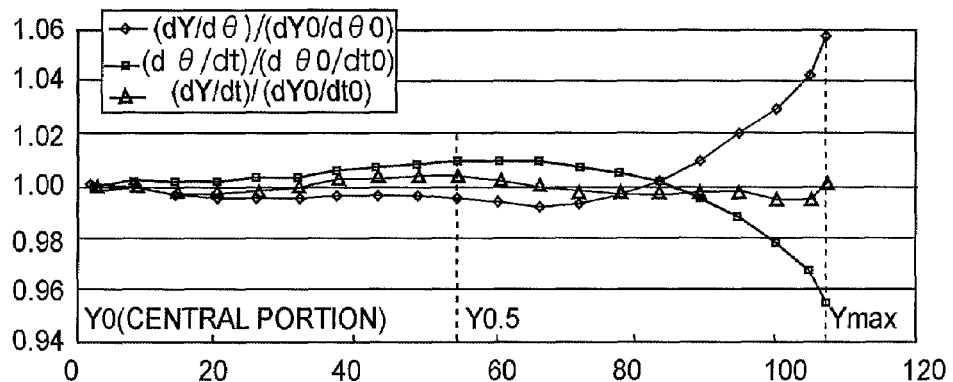
FIG. 11 is a graph illustrating the relationship of characteristics with respect to time, in a second embodiment of the present invention.

FIG. 11 is a graph showing the relationship of dθ/dt of the oscillating element and dY/dθ of the image formation means, with respect to the image height Y in the second embodiment of the present invention.

Now, a symbol θ denotes the deflection angle of the oscillating element 55 as defined in the main-scan section when the light beam from the oscillating element 55 scans the scan position Y, in the main-scan direction, within the effective scan region (effective scan range). A symbol t denotes the time moment.

Furthermore, a symbol dθ denotes the amount of change of the deflection angle θ corresponding to the amount of change dt of the time t, and a symbol dY denotes the amount of change at the scan position corresponding to the amount of change dθ.

Furthermore, a symbol $Y_0$ denotes the scan position when the scanning center (central portion) is scanned, while the time moment is denoted by $t_0$ and the deflection angle is denoted by $θ_0$.

A symbol $Y_{max}$ denotes the scan position when the maximum position of the effective scan region (effective scan range) is scanned, while the time moment is denoted by $t_{max}$ and the deflection angle is denoted by $θ_{max}$.

A symbol $Y_{0.5}$ denotes the scan position when a position corresponding to 50% of the maximum position of the effective scan range is scanned, while the time moment is denoted by $t_{0.5}$ and the deflection angle is denoted by $θ_{0.5}$.

In FIG. 11, the axis of abscissas shows the range from the centre position $Y_0$ (central portion) of the effective scan range to the maximum scan position $Y_{max}$.

Curve $(dθ/dt)/(dθ_0/dt_0)$ concerns the angular speed dθ/dt of the oscillating element 55.

Curve $(dY/dθ)/(dY_0/dθ_0)$ illustrates the scan of the scan surface 57 with a light beam through the imaging lens 6. Here, the curve concerns the ratio dY/dθ where dY denotes the amount of change of the scan position Y corresponding to the amount of change dθ as the deflection angle of the oscillating element 55 is θ. The curve is expressed with reference to $(dY/dθ)/(dY_0/dθ_0)$.

Curve $(dY/dt)/(dY_0/dθ_0)$ concerns the scanning speed dY/dt of the light beam upon the scan surface 7.

Now, a symbol $θ_0$ denotes the deflection angle of the oscillating element 55 when the light beam scans the center $Y_0$ on the scan surface 57, and a symbol $dθ_0/dt_0$ denotes the angular speed of the oscillating element 55 at that time.

A symbol $θ_{max}$ denotes the deflection angle of the oscillating element 55 when the light beam scans the maximum scan position $Y_{max}$ in the effective scan region upon the scan surface 57, and a symbol $dθ_{max}/dt_{max}$ denotes the angular speed of the oscillating element 55 at that time.

A symbol $θ_{0.5}$ denotes the deflection angle of the oscillating element 55 when the light beam scans the scan position $Y_{0.5}$ corresponding to 50% of the maximum scan position $Y_{max}$ in the effective scan region upon the scan surface 57, and a symbol $dθ_{0.5}/dt_{0.5}$ denotes the angular speed of the oscillating element 55 at that time.

A symbol θ denotes the deflection angle of the oscillating element 55 when the light beam scans the scan position Y in the effective scan region on the scan surface 57.

A symbol $dY_0$ denotes the amount of change at the central position $Y_0$ (scan position Y0) on the scan surface 57, with reference to the amount of change $dθ_0$ at the deflection angle $θ_0$ of the oscillating element 55.

A symbol $dY_{max}$ denotes the amount of change at the scan position $Y_{max}$ on the scan surface 57, with reference to the amount of change $dθ_{max}$ at the maximum deflection angle $θ_{max}$ of the oscillating element 55.

A symbol $dY_{0.5}$ denotes the mount of change at the scan position $Y_{0.5}$ on the scan surface 57, with reference to the amount of change $dθ_{0.5}$ at the deflection angle $θ_{0.5}$ of the oscillating element 55.

A symbol dY denotes the amount of change at the scan position Y on the scan surface 57, with reference to the amount of change dθ at the deflection angle θ of the oscillating element 55.

A symbol $dY_0/dt_0$ denotes the scanning speed when the light beam scans the centre position $Y_0$ (scan position $Y_0$) on the scan surface 57.

A symbol dY/dt denotes the scanning speed when the light beam scans the scan position Y within the effective scan region on the scan surface 57.

In FIG. 11, as the scan position displaces from the centre position $Y_0$ on the scan surface 57 toward the maximum scan position $Y_{max}$ on the scan surface 57, the value of $(dθ/dt)/(dθ_0/dt_0)$ increases and then takes an extreme value, and decreases afterwards.

In other words, in the present embodiment, when an area on the scan surface 57 from the centre position $Y_0$ to the maximum scan position $Y_{max}$ is scanned with the light beam, the value of angular speed dθ/dt of the oscillating element 55 with a deflection angle θ once increases, and it decreases afterwards.

In FIG. 11, the axis of abscissa denotes the area of the effective scan region (effective scan range) from the centre position $Y_0$ (central portion) to the maximum scan position $Y_{max}$ (peripheral edge portion).

Hence, in the second embodiment as well, the components are set to satisfy all the following conditions, and image quality degradation is avoided thereby.

$$(dθ_{max}/dt_{max}) < (dθ_0/dt_0) \quad (1)$$

$$(dY_0/dθ_0) < (dY_{max}/dθ_{max}) \quad (2)$$

$$(dθ_0/dt_0) < (dθ_{0.5}/dt_{0.5}) \quad (3)$$

$$(dY_{0.5}/dθ_{0.5}) < (dY_0/dθ_0) \quad (4)$$

$$0.85 < (dY/dθ)/(dY_0/dθ_0) < 1.15 \quad (5)$$

$$0.9 \leq (dY/dt)/(dY_0/dt_0) \leq 1.1 \quad (6)$$

In the second embodiment of the present invention, if the oscillation period of the whole oscillating element is denoted by T, the scanning time in which the light beam scans over the scan surface 57 is 0.288 T which is larger than 0.25 T.

Here, if an oscillating element which is represented by $$θ = θ_0 \cdot \sin(2πt/T)$$

is used where θ denotes the deflection angle of the light beam, it is required to complete the printing within the time duration not less than −0.082 T and not greater than +0.082 T, in order to satisfy the conditional expressions mentioned hereinbefore. Here, $θ_0$ is twofold of the maximum deflection angle $θ_{max}$ of the oscillating element, and t is time and T denotes the oscillation period of the whole oscillating element.

Therefore, in order to control deterioration of the printing quality by using conventional oscillating elements, the printing should be done only in the time duration corresponding to 16.4% of one period.

In consideration of these, in the second embodiment, a nest-like oscillating element 55 such as shown in FIG. 3 is used to assure constant-speed light-beam deflection and to enable a printing operation in the time duration corresponding to 25% or more of one period.

Now, it is assumed that the deflection angle θ1 of the first oscillating member 11 is expressed by $$\theta 1 = \phi 1 \cdot \sin(\omega t)$$

and the deflection angle θ2 of the second oscillating member 12 taking the attitude of the first oscillating member 11 as a reference is expressed by $$\theta 2 = -\phi 2 \cdot \sin(2\omega t)$$

wherein

φ1 denotes the maximum deflection angle of the first oscillating member 11,

φ2 denotes the maximum deflection angle of the second oscillating member 12, ω denotes the angular speed of the first oscillating member 11, and t is time.

As shown in FIG. 3, since the fixed member 10, first oscillating member 11 and second oscillating member 12 are coupled together along a straight line by means of torsion bars 13 which are elastic members, the deflection angle θ11 of the second oscillating member 12 with reference to the fixed member 10 can be expressed as $$\theta 11 = \phi 1 \cdot \sin(\omega t) - \phi 2 \cdot \sin(2\omega t).$$

Also, the angular speed ω11 of the deflection angle of the second oscillating member 12 can be expressed as $$\omega 11 = \omega \{\phi 1 \cdot \cos(\omega t) - 2\phi 2 \cdot \cos(2\omega t)\}.$$

In the present embodiment, if φ1=37.28 deg., φ2=5.21 deg. and ω=1*10$^4$*π [rad/sec] (5 kHZ if converted in terms of frequency), the angular speed of the second oscillating member 12 will be such as shown at dθ/dt in FIG. 12.

In FIG. 11, the axis of abscissas denotes t/T, and the axis of ordinate denotes the angular-speed error value (rate) of the angular speed ω11(t) of the second oscillating member 12 at arbitrary time t, with reference to the angular speed ω11 (t=0) of the second oscillating member 12 at time t=0. Here, T is the oscillation period 0.2 msec of the first oscillating member 11.

More specifically, the angular-speed error value of the axis of ordinate of FIG. 4 means "(the angular speed ω11(t) of the second oscillating member 12 at an arbitrary time moment t) divided by (the angular speed ω11(t=0) of the second oscillating member 12 at time t=0)".

In FIG. 11, when the angular-speed error value (rate) is equal to 1 in the whole region of time domain t/T, it means that the angular speed is constant regardless of time. Furthermore, the point t/T±0.25 defines the turn timing of the first oscillating member 11. If the printing is carried out only by one-direction scan, the scan exceeding the point t/T±0.25 is no more possible.

In this embodiment, the time domain t/T to be used for the printing is made not less than −0.149 and not greater than +0.149. Based on this, the difference value [%] of the angular-speed error with reference to the angular speed of the second oscillating member 12 at time t=0 becomes not less than −4.5% and not greater than +0.1%.

Hence, in the present embodiment, the difference value [%] of the angular-speed error is controlled with a drift of ±10% or less, within the range of the time domain t/T used for the printing. Thus, the present embodiment has accomplished an advantageous result that the angular speed is held fixed in the time domain t/T used for the printing.

As compared therewith, if a conventional sinusoidal vibration element having only one oscillating member is used, in the time domain t/T the difference value [%] of the angular-speed error becomes not less than −40.7% and not greater than 0%. This means that there is a problem that the angular speed cannot be held constant.

When there is no optical system all over the optical path after the oscillating element 55 as the deflecting means for deflecting a light beam at constant angular-speed, the scanning speed of the light beam on the scanned surface cannot be constant. As the light beam nears the periphery of the effective scan region (image active area) on the scanned surface, the scanning speed becomes fast. Therefore, in order to carry the fθ characteristic on the oscillating element 55, the angular speed of the oscillating element 55 should be slowed down as the light beam nears the periphery of the effective scan region (image active area) on the scanned surface.

In the present embodiment, the angular speed is slowed down at points in the time domain for the printing, not less than 0.08 and not greater than 0.149. Based on this, the fθ characteristic is partly carried on the oscillating element 55.

Furthermore, in the case of the present embodiment, in the range of the time domain t/T for the printing not less than −0.149 and not greater than +0.149, the second oscillating member 12 oscillates with an angle in a range of not less than −25.02 deg. and not greater than +25.02 deg. Therefore, the width of the deflection angle of the light beam defined in the main-scan section (light rays) is 50.04*2=100.08 deg. Hence, it can be said that an enough angle is provided.

In this embodiment, the deflection angle θ of the light beam scanningly deflected by the deflecting surface of the oscillating element 55 is set to be not less than 80 deg. and not greater than 160 deg.

In the present embodiment, the thickness of the imaging lens 6 is thinned to 8.5 mm or less by partly carrying the fθ characteristic on the oscillating element 55 and by making the light beam emitted from the condenser lens 2 into a convergent light beam in the main-scan section. Based on this, downsizing and light-weighting of the optical scanning device as a whole are attempted.

In this embodiment, when the maximum thickness Dt of the imaging lens 6 is 8.5 mm and the scan width (effective scan range) W on the scanned surface 7 in the main-scan direction is 214 mm. Hence, Dt/W is equal to 0.0397, and it satisfies the condition:

$$0.01 \leq Dt/W \leq 0.04 \quad (7)$$

FIG. 11 is a graph showing the relationship of the angular speed dθ/dt of the oscillating element 55 and the positional change dY/dθ on the scan surface 57 of the light beam passed through the imaging lens 6, with respect to t/T, in the second embodiment of the present invention. Also, FIG. 11 is a graph showing the relationship of the scan speed dY/dt as the light beam scans the scan position Y in the main-scan direction within the effective scan region, with respect to t/T in the second embodiment of the present invention.

It is seen from FIG. 11 that the present embodiment uses a combination of an oscillating element 55 having an angular speed dθ/dt which becomes slower as t/T grows large, and an imaging lens 6 in which dY/dθ grows large as t/T grows large. Therefore, it is seen that that the light beam performs constant-speed scan at a scanning speed dY/dt with an error of ±2% or less, in the effective scan region on the scan surface 57.

The error in the constant speed corresponds to a partial magnification, on the scan surface 57, of a conventional imaging optical system having a rotary polygon mirror and a fθ characteristic. If the error of constant speed goes over ±3% in the effective scan region, it becomes quite notable that printed image is expanded or contracted at some positions, and it is very unfavorable.

Embodiment of Image Forming Apparatus

Figure 7:
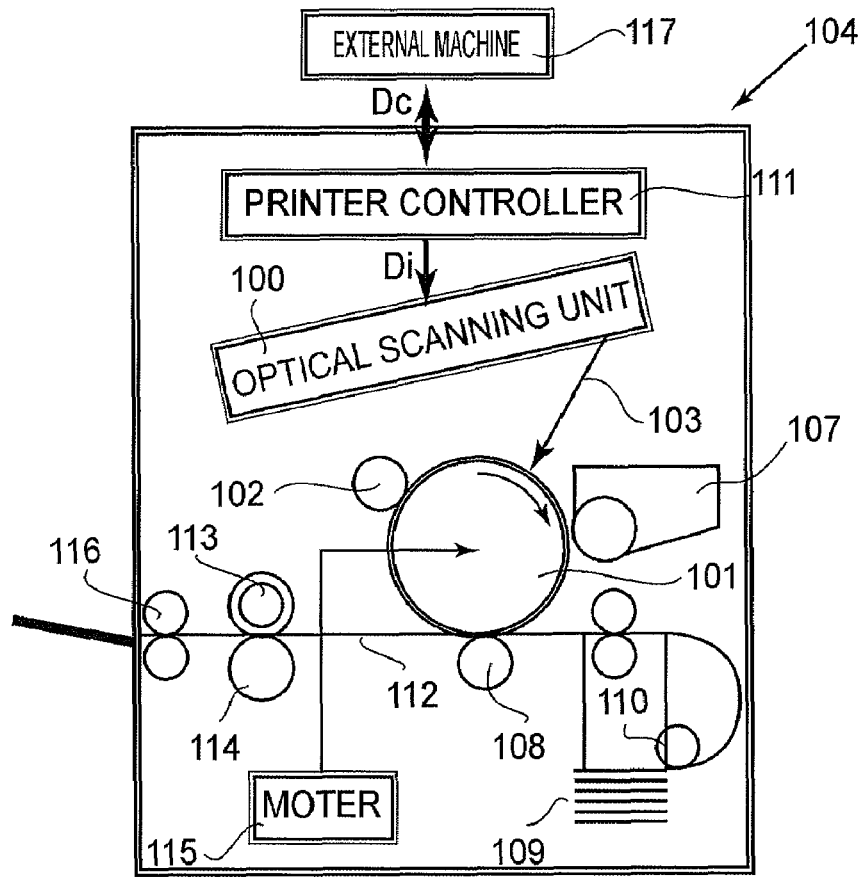
FIG. 7 is sub-scan sectional view showing an embodiment of an image forming apparatus according to the present invention.

FIG. 7 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is so disposed to contact the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 15) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 7) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 7, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 8:
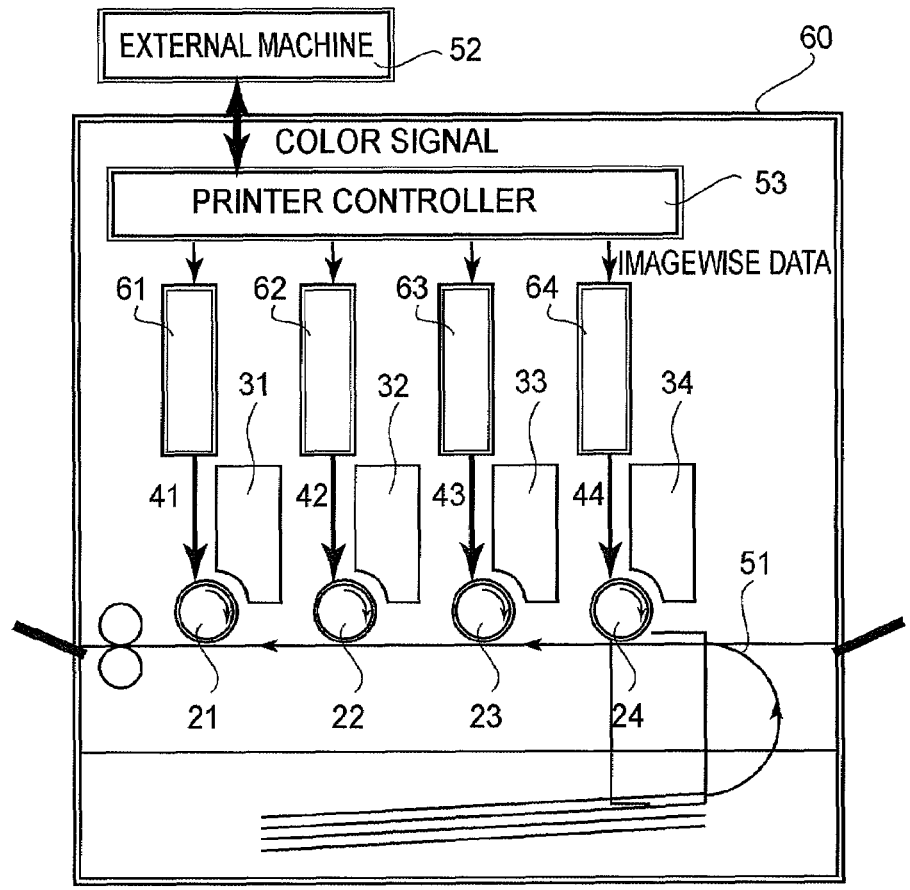
FIG. 8 is a schematic diagram of a main portion of a collar image forming apparatus according to an embodiment of the present invention.
Figure 9:
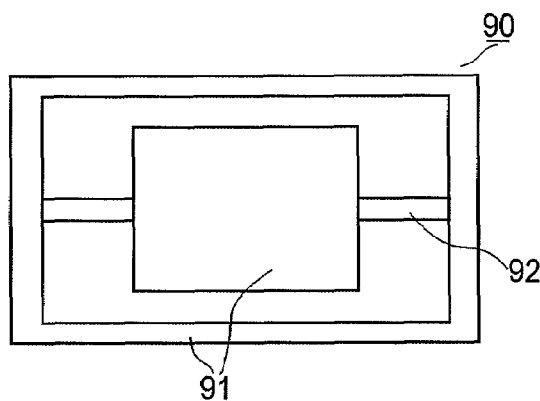
FIG. 9 is a schematic diagram of a main portion of conventional deflecting means.

FIG. 8 is a schematic view of a main portion of a color image forming apparatus according to an embodiment of the present invention. This embodiment is directed to a tandem type color image forming apparatus in which four optical scanning systems (optical imaging means) are provided so as to record imagewise data upon the surfaces of corresponding photosensitive drums (image bearing members) in parallel to each other.

In FIG. 8, denoted generally at 60 is a color image forming apparatus, and denoted at 61, 62, 63 and 64 are optical scanning systems having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

Although not shown in FIG. 8, there are a transfer device for transferring the toner image, developed by the developing device, to a transfer material, and a fixing device for fixing the transferred toner image on the transfer material.

In FIG. 8, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 61, 62, 63 and 64, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning systems 61, 62, 63 and 64 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 61, 62, 63 and 64 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Applications No. 2006-230659 filed Aug. 28, 2006 and No. 2007-213825 filed Aug. 20, 2007, for which is hereby incorporated by reference.

What is claimed is:

1. An optical scanning device, comprising:
light source means;
deflecting means configured to scanningly deflect a light beam emitted from said light source means; and
an imaging optical system configured to image the light beam scanningly deflected by said deflecting means, upon a scan surface to be scanned,
wherein said deflecting means includes an oscillating element configured to reciprocally scan the scan surface with the light beam from said light source means,
wherein relations $$(d\theta_{max}/dt_{max}) < (d\theta_0/dt_0)$$

$$(dY_0/d\theta_0) < (dY_{max}/d\theta_{max})$$

$$(d\theta_0/dt_0) < (d\theta_{0.5}/dt_{0.5}) \text{ and}$$

$$(dY_{0.5}/d\theta_{0.5}) < (dY_0/d\theta_0)$$

are satisfied throughout a whole effective scan region on the scan surface, where
$\theta_0$ is the deflection angle of said oscillating element as the light beam scans a centre position $Y_0$ of the effective scan region on the scan surface with respect to the main-san direction, and $d\theta_0/dt_0$ is an angular speed of said oscillating element at that time,
$\theta_{max}$ is a maximum deflection angle of said oscillating element as the light beam scans a maximum scan position $Y_{max}$ in the effective scan region on the scan surface with respect to the main-scan direction, and $d\theta_{max}/dt_{max}$ is the angular speed of said oscillating element at that time,
$\theta_{0.5}$ is the deflection angle of said oscillating element as the light beam scans a scan position $Y_{0.5}$ corresponding to 50% of the maximum scan position $Y_{max}$ in the effective scan region on the scan surface with respect to the main-scan direction, and $d\theta_{0.5}/dt_{0.5}$ is the angular speed of said oscillating element at that time,
$dY_0$ is an amount of change at the centre position $Y_0$ on the scan surface with respect to the main-scan direction, with reference to an amount of change $d\theta_0$ of said oscillating element at the deflection angle $\theta_0$,
$dY_{max}$ is an amount of change at the maximum scan position $Y_{max}$ on the scan surface with respect to the main-scan direction, with reference to an amount of change $d\theta_{max}$ of said oscillating element at the maximum deflection angle $\theta_{max}$, and
$dY_{0.5}$ is an amount of change at the scan position $Y_{0.5}$ on the scan surface with respect to the main-scan direction, with reference to an amount of change $d\theta_{0.5}$ of said oscillating element at the deflection angle $\theta_{0.5}$.

2. An optical scanning device according to claim 1, wherein a relation $$0.85 < (dY/d\theta)/(dY_0/d\theta_0) < 1.15$$

is satisfied throughout the whole effective scan region, where
$\theta_0$ is the deflection angle of said oscillating element as the light beam scans the centre position $Y_0$ of the effective scan region on the scan surface with respect to the main-scan direction,
$\theta$ is the deflection angle of said oscillating element as the light beam scans a scan position $Y$ in the effective scan region on the scan surface with respect to the main-scan direction,
$dY_0$ is an amount of change at the centre position $Y_0$ on the scan surface with respect to the main-scan direction, with reference to an amount of change $d\theta_0$ of said oscillating element at the deflection angle $\theta_0$, and
$dY$ is an amount of change at the scan position $Y$ on the scan surface, with reference to an amount of change $d\theta$ of said oscillating element at the deflection angle $\theta$.

3. An optical scanning device according to claim 2, wherein a relation $$0.9 \leq (dY/dt)/(dY_0/dt_0) < 1.1$$

is satisfied throughout the whole effective scan region, where
$dY_0/dt_0$ is a scan speed as the light beam scans the centre position $Y_0$ of the effective scan region on the scan surface with respect to the main-scan direction, and
$dY/dt$ is a scan speed as the light beam scans a scan position $Y$ in the effective scan region on the scan surface with respect to the main-scan direction.

4. An optical scanning device, comprising:
light source means;
deflecting means configured to scanningly deflect a light beam emitted from said light source means; and
an imaging optical system configured to image the light beam scanningly deflected by said deflecting means, upon a scan surface to be scanned,
wherein said deflecting means includes an oscillating element configured to reciprocally scan the scan surface with the light beam from said light source means,
wherein, when an area of an effective scan region on the scan surface from a centre position $Y_0$ of the effective scan region with respect to a main-scan direction to a maximum scan position $Y_{max}$ in the effective scan region with respect to the main-scan direction is scanned with the light beam, a value of an angular speed $d\theta/dt$ of said oscillating element at a deflection angle $\theta$ as the light beam scans a position $Y$ in the effective scan region on the scan surface with respect to the main-scan direction, increases and subsequently decreases, and wherein, a relation $$0.85 < (dY/d\theta)/(dY_0/d\theta_0) < 1.15$$

is satisfied throughout the whole effective scan region, where
- $\theta_0$ is the deflection angle of said oscillating element as the light beam scans the centre position $Y_0$ of the effective scan region on the scan surface with respect to the main-scan direction,
- $\theta$ is the deflection angle of said oscillating element as the light beam scans a scan position Y in the effective scan region on the scan surface with respect to the main-scan direction,
- $dY_0$ is an amount of change at the centre position $Y_0$ on the scan surface with respect to the main-scan direction, with reference to an amount of change $d\theta_0$ of said oscillating element at the deflection angle $\theta_0$, and
- $dY$ is an amount of change at the scan position Y on the scan surface, with reference to an amount of change $d\theta$ of said oscillating element at the deflection angle $\theta$.

5. An optical scanning device according to claim 1, wherein said oscillating element is configured to scan the scan surface so as to form an image in the effective scan region thereof based on only one of a forward stroke and a backward stroke of oscillation, and wherein, when an oscillation period of said oscillating element as a whole is denoted by T, a scan time in which the light beam scans the scan surface is not less than 0.25T.

6. An optical scanning device according to claim 5, wherein said imaging optical system is comprised of a single imaging lens, and wherein, a relation $$0.01 \leq Dt/W \leq 0.04$$

is satisfied, where Dt is a largest thickness of said imaging lens, and W is a scan width on the scan surface with respect to the main-scan direction.

7. An image forming apparatus, comprising:
an optical scanning device as recited in claim 1;
a photosensitive drum disposed at a scan surface to be scanned by said optical scanning device;
a developing device for developing an electrostatic latent image formed on said photosensitive drum through a light beam scanningly deflected by said optical scanning device, to produce a toner image;
a transferring device for transferring the developed toner image onto a transfer material; and
a fixing device for fixing the transferred toner image, on the transfer material.

8. An image forming apparatus, comprising:
an optical scanning device as recited in claim 1; and
a printer controller for converting code data supplied from an outside machine into an imagewise signal and for inputting the imagewise signal into said optical scanning device.

9. An image forming apparatus, comprising:
an optical scanning device as recited in claim 4;
a photosensitive drum disposed at a scan surface to be scanned by said optical scanning device;
a developing device for developing an electrostatic latent image formed on said photosensitive drum through a light beam scanningly deflected by said optical scanning device, to produce a toner image;
a transferring device for transferring the developed toner image onto a transfer material; and
a fixing device for fixing the transferred toner image, on the transfer material.

10. An image forming apparatus, comprising:
an optical scanning device as recited in claim 4; and
a printer controller for converting code data supplied from an outside machine into an imagewise signal and for inputting the imagewise signal into said optical scanning device.

* * * * *